July 25, 1961 V. LANGEN 2,993,716
BALL AND SOCKET JOINTS
Filed June 11, 1957
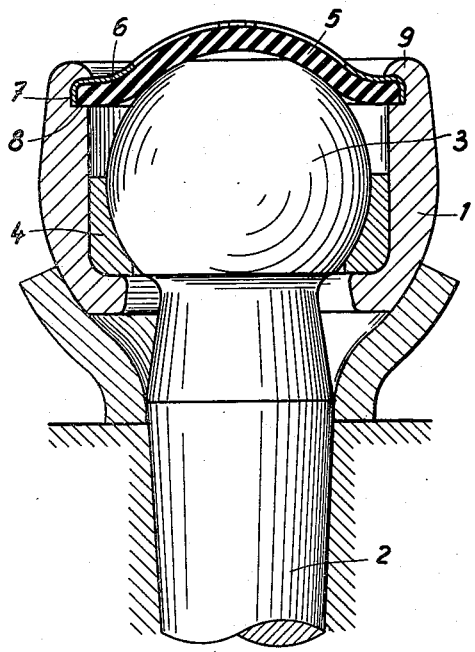
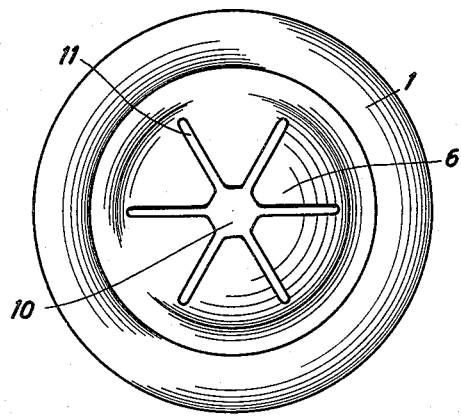
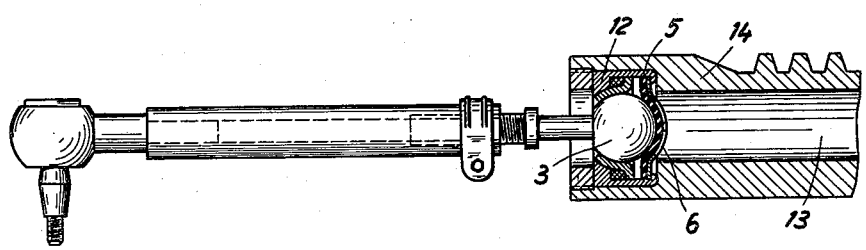
Inventor
VIKTOR LANGEN
BY Robert H. Jacob
AGENT

United States Patent Office 2,993,716
Patented July 25, 1961

2,993,716
BALL AND SOCKET JOINTS
Viktor Langen, Meererbusch, near Dusseldorf, Germany, assignor to A. Ehrenreich & Cie., Dusseldorf, Germany
Filed June 11, 1957, Ser. No. 664,963
Claims priority, application Germany Feb. 15, 1957
2 Claims. (Cl. 287—90)

This invention relates to a ball and socket joint which is intended particularly, but not exclusively, for use in the steering gear of power vehicles and consists of a socket and a ball head which is supported in the socket and from which a pin projects out of the socket, the ball being seated on the side from which the pin projects from the socket on a hollow spherical surface in the socket and bearing on the opposite closed side of the socket against a yieldable supporting member.

In the known ball and socket joints of the above-mentioned kind, there is provided, between a closure member for the socket and the ball or a bearing member for the ball, a yieldable pressure member in order to enable the joint to yield to a certain extent in the axial direction of the ball pin. The pressure member then not only constitutes an additional part, but usually also increases the structural height of the joint and, therefore, necessitates the use of an increased quantity of material. Both of these features increase the cost of manufacture.

According to the invention, the supporting member consists of a disc of elastic yieldable material, for example artificial material, the curvature of which conforms of the curvature of the ball, and is covered on the outside by a rigid cover plate which is of the same curvature as the elastic disc, and the edges of the disc and cover plate are fixed in the open end of the socket. The cover plate is preferably made of metal, for example sheet metal. The cover plate is slotted radially from its center, for example from a central hole, so as to form resilient tongues. By this means, the socket of the joint is tightly closed by a disc-like closure member which acts at the same time as a spring which enables the joint to yield in the direction of the axis of the pin of the ball. The elastic disc which is preferably made of a wear-resistant artificial material having good anti-friction properties. For example the material known as Vulkollan of Farbenfabriken Bayer, effects the tight closure, whereas the cover plate strengthens the elastic disc and at the same time permits the joint to yield in the axial direction. The elastic disc can be curved into a shape conforming to the curvature of the ball during its insertion itno the socket. It may, however, also be given a correspondingly curved form before it is inserted into the socket. It can be combined in any suitable manner with the cover plate.

Preferably, the edge of the elastic disc is disposed on a shoulder in the socket and surrounded on this shoulder by a distance ring, the height of which corresponds to the thickness of the disc and on which edge the cover plate rests. In this way any squeezing of the edge of the elastic disc by the edge of the cover is prevented.

The arrangement may be such that the cover plate is formed with an edge flange which surrounds the elastic disc and the height of which corresponds to the thickness of the elastic disc, so that the distance ring is formed directly by the edge of the cover plate which reduces the cost of the joint and facilitates assembly.

The cover plate and the elastic disc can then be fixed in a simple manner by placing the plate and elastic disc on a shoulder formed by a bore which is larger than the bore in the socket and bending over the outer edge of the socket.

Two constructional embodiments of a ball and socket joint in accordance with the invention are illustrated, by way of example, in the accompanying drawing, in which FIGURE 1 is a section through the ball and socket joint;

FIGURE 2 is a plan of FIGURE 1, and

FIGURE 3 is an axial joint in longitudinal cross-section.

The ball and socket joint consists of a socket 1 and a ball 3 provided with a pin 2 which extends out of the socket. At the side from which the pin 2 projects from the socket, the ball rests in a hollow spherical surface which, in the example illustrated, is formed in a steel cup 4.

The cup 4 can also be made of artificial material which may, or may not, have elastic properties, for example the material known as Vulkollan of Farbenfabriken Bayer, or of an artificial material on the basis of polyamides and superpolyamides. The hollow spherical surface can also be formed directly in the socket. Alternatively, it can be formed by a shell which is inserted into the socket and is mounted in a corresponding hollow spherical surface of the socket.

A disc 5 of elastic material is placed on the head of the ball on the closure side of the socket. The disc is curved to a curvature which corresponds to the curvature of the ball. The disc is disposed in a cover plate 6, an edge flange 7 of which extends around the disc 5. The height of the edge flange 7 corresponds to the thickness of the disc 5. The edge flange of the cover plate 6 rests on a shoulder 8 in the interior of the socket. The edge of the elastic disc 5 also rests on the shoulder. The edge 9 of the opening in the socket is bent over the edge of the cover disc 6. The shoulder 8 is formed by a recess or counterbore in the socket.

If a shell or cup for forming the seating of the ball is disposed in this socket at the outlet end for the pin 2, the shell or cup may have an upward cylindrical extension, so that its edge forms the shoulder on which the disc 5 and plate 6 rest.

A central hole 10 is provided in the disc 6, and radial slots 11 extend outwardly from this hole 10.

In the joint illustrated in FIGURE 3, which may be used in the steering gear of vehicles, the socket in which the ball is disposed is formed by a ring 12. The ring is inserted in the axial bore 13 of a rack 14.

I claim:

1. A ball and socket joint for the steering gear of vehicles or the like, comprising a socket and a ball headed pin received in said socket, said socket having an open upper end presenting a shoulder adapted to receive a closure and a lower end defining an aperture, a bearing shell presenting a spherical bearing surface seated in said socket around said aperture, said ball headed pin having a pin portion and a ball head presenting a generally spherical bearing surface and being seated in said socket with the spherical bearing surface of said ball head in engagement with the spherical bearing surface of said shell and said pin portion extending through said aperture, and a curved resilient closure of a curvature corresponding to that of the ball head and comprising a closed inner shell of elastic material having one side in engagement with said ball head and a shell of rigid material such as metal having a curved radially slotted portion presenting resilient tongues in engagement with the other side of said shell of elastic material, said closure having a flanged outer portion firmly seated on said shoulder portion around the open upper end of said socket and said shell of rigid material defining an annular portion around the outer periphery of said shell of elastic material having a height corresponding to the thickness of said elastic material.

2. A ball and socket joint in accordance with claim 1 wherein said socket is provided with a cylindrical bore therein adapted to receive said bearing shell and presents an annular recess of greater diameter than said cylindrical bore defining said shoulder, and that a portion above said recess is crimped over said shell of rigid material retaining said closure in place.

References Cited in the file of this patent

UNITED STATES PATENTS

| | | |
|---|---|---|
| 25,724 | Calrin | Oct. 11, 1859 |
| 620,222 | Browne et al. | Feb. 28, 1899 |
| 883,811 | Draus | Apr. 7, 1908 |
| 2,017,627 | Hodny | Oct. 15, 1935 |
| 2,048,803 | Marles | July 28, 1936 |
| 2,424,914 | Brown | July 29, 1947 |
| 2,553,232 | Beyer | May 15, 1951 |
| 2,591,832 | Kogstrom | Apr. 8, 1952 |
| 2,613,575 | Falge | Oct. 14, 1952 |
| 2,853,326 | Booth | Sept. 23, 1958 |

FOREIGN PATENTS

| | | |
|---|---|---|
| 513,858 | Italy | Feb. 7, 1955 |